United States Patent [19]

Pendleton

[11] 4,126,320

[45] Nov. 21, 1978

[54] SHAFT SEALS

[75] Inventor: Darrell D. Pendleton, Gastonia, N.C.

[73] Assignee: Garlock Inc., Rochester, N.Y.

[21] Appl. No.: 779,270

[22] Filed: Mar. 18, 1977

Related U.S. Application Data

[62] Division of Ser. No. 544,803, Jan. 27, 1975, Pat. No. 4,038,359.

[51] Int. Cl.² ............................................. F16J 15/32
[52] U.S. Cl. ..................................................... 277/152
[58] Field of Search ................ 277/152, 153, 134, 165

[56] References Cited

U.S. PATENT DOCUMENTS

| | | | |
|---|---|---|---|
| 2,437,901 | 3/1948 | Winkeljohn | 277/153 |
| 2,476,324 | 7/1949 | Reich | 277/152 |
| 3,099,454 | 7/1963 | Walinski | 277/152 |
| 3,938,813 | 2/1976 | Forch | 277/134 |

*Primary Examiner*—Robert I. Smith
*Attorney, Agent, or Firm*—Schovee & Boston

[57] ABSTRACT

A shaft seal of the type including a metal case and a polytetrafluoroethylene sealing element, is provided with an auxiliary sealing lip by providing a radial flange of the metal case with a plurality of circumferentially spaced-apart apertures therethrough and molding an annular filler ring of synthetic rubber in the space between the sealing element and the metal case such that the rubber also flows through the apertures to the other side of the radial flange of the metal case and forms an auxiliary lip there. The filler ring chemically bonds to the metal case and mechanically bonds to the sealing element to lock the sealing element in place while also forming an auxiliary lip.

5 Claims, 1 Drawing Figure

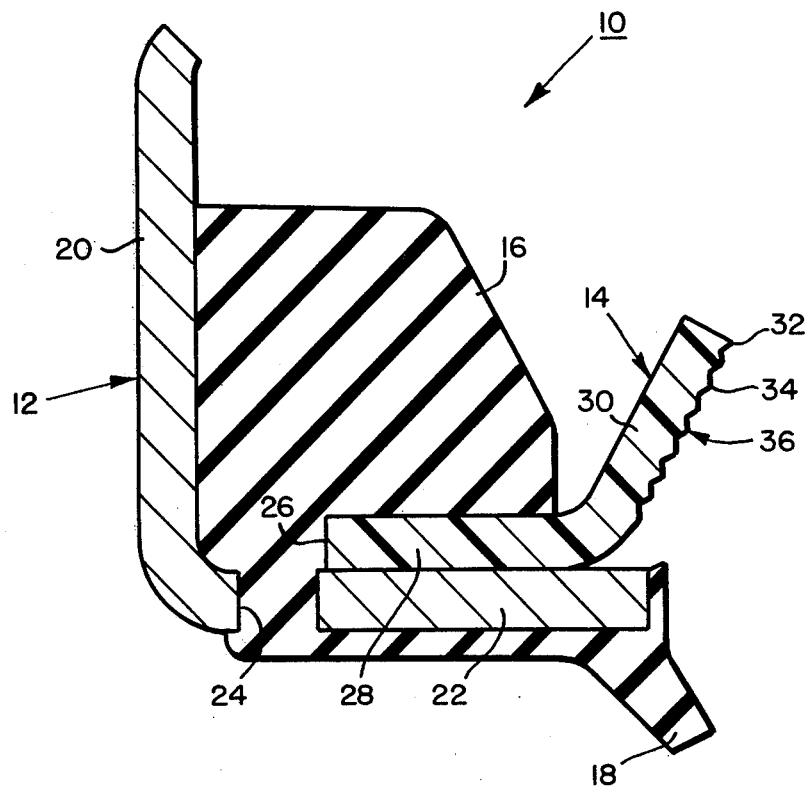

BONDED TFE SEAL WITH DUAL LIP

CROSS REFERENCE TO RELATED APPLICATION

This is a division of application Ser. No. 544,303 filed Jan. 27, 1975, and now U.S. Pat. No. 4,038,359 issued July 26, 1977.

BACKGROUND OF THE INVENTION

This invention relates to shaft seals, also known as oil seals, designed for sealing against fluid leakage along shafts and more particularly to shaft seals of the type employing a metal case and a polytetrafluoroethylene sealing element and requiring an auxiliary sealing lip.

It is an object of the present invention to provide a shaft seal (and a method for making the seal) of the type employing a metal case and a polytetrafluoroethylene sealing element with a molded auxiliary lip for keeping out dust and contaminates. The method is economical in that it provides the auxiliary lip with very little or no additional expense.

SUMMARY OF THE PRESENT INVENTION

A shaft seal of the type having a metal case with a radial flange and a cylindrical portion and a polytetrafluoroethylene sealing element is provided with an auxiliary lip by providing a plurality of circumferentially spaced-apart apertures through a radial flange of the metal case, positioning the sealing element adjacent the inside surface of the radial flange of the metal case (the inside surface being that surface on the same side of the radial flange as is the cylindrical portion) but spaced radially inwardly from the apertures, and molding an annular filler ring of synthetic rubber between the sealing element and the cylindrical portion of the metal case such that it bonds to the metal case, and to the sealing element, and flows through the apertures to the outside of the radial flange to form an auxiliary lip that also bonds to the radial flange.

BRIEF DESCRIPTION OF THE DRAWING

The present invention will be more fully understood by reference to the following detailed description thereof, when read in conjunction with the attached drawing, wherein The FIGURE is a cross-sectional view through one half of a shaft seal made according to a preferred embodiment of the present invention.

DETAILED DESCRIPTION OF THE PREFERRED EMBODIMENT

With reference now to the drawing, the FIGURE shows a shaft seal 10, including an annular metal case 12, a polytetrafluoroethylene sealing element 14, a molded-in annular filler ring 16 of synthetic rubber and an auxiliary lip 18 also molded from the synthetic rubber. The metal case 12 includes a cylindrical portion 20, a radial flange 22 and a plurality of circumferentially spaced apart apertures 24 in the radial flange 22. The sealing element 14 has an O.D. 26 positioned radially inwardly from the apertures 24 and includes a radial portion 28 and a frusto conical portion 30 having a sealing lip 32 and a plurality of hydrodynamic pumping elements 34 on a shaft engaging surface 36 thereof. The pumping elements 34 are not essential, but can be molded into the sealing element 14 at the same time that the filler ring 16 is molded in place, if desired.

The shaft seal 10 is made by positioning the metal case 12 in a mold with the sealing element 14 in place against the radial flange 22, and placing a blank prep form of synthetic rubber between the sealing element 14 and the cylindrical portion 20 of the metal case 12. When the mold is closed, the annular filler ring 16 is formed in position as shown and a portion of the synthetic rubber flows through the apertures 24 to the side of the radial flange 22 opposite the sealing element 14 to form the molded auxiliary lip 18. The synthetic rubber chemically bonds to the metal of the case 12 and mechanically bonds to the polytetrafluoroethylene sealing element 14. The manner in which a mechanical bond is formed between a rubber element such as the filler ring 16, and a polytetrafluoroethylene element such as the sealing element 14, and a chemical bond is formed between a rubber element and a metal element, such as the metal case 12, are well-known to those skilled in the art and in and of itself forms no part of the present invention and therefore need not be described in detail herein. It will suffice, therefore, to simply state that the sealing element 14 is etched, by acid for example, to provide a large number of small pits for the rubber of the filler ring 16 to flow into, to provide the mechanical bonding, as is well-known in the art. The metal case 12 is phosphated and cemented (using, for example, a methyl ethyl ketone base adhesive), prior to insertion into the mold, to provide the chemical bond, as is also well-known in the art. The mold usually is closed for about 3-4 minutes, and a temperature of about 360°-400° F. and a pressure of about 16,000-20,000 psi is used.

While the present invention has been described in detail with respect to the preferred embodiments thereof it is noted that various modifications and changes can be made therein as will be evident to one skilled in the art. For example, the outside diameter of the sealing element may extend all the way to the cylindrical portion of the metal case 12, however, in such case the sealing element 14 would be provided with a plurality of circumferentially spaced-apart openings to register with the apertures 24 so that the synthetic rubber can flow through to the opposite side of the radial flange.

I claim:
1. A shaft seal comprising:
   (a) a single annular metal case having a radial flange and a cylindrical portion;
   (b) an annular polytetrafluoroethylene sealing element including a radial portion and a sealing lip, said radial portion being in contact with an inside surface of said radial flange of said case;
   (c) a molded, annular, synthetic rubber filler ring bonded to both said cylindrical portion of said metal case and the inside surface of said radial portion of said sealing element, said ring being located in the annular space between said radial portion of said sealing element and said cylindrical portion of said metal case and being a solid body substantially filling said annular space and being spaced away from and out of contact with said sealing lip; and
   (d) an annular auxiliary lip molded from said synthetic rubber, bonded to said metal case and located on the opposite side of said radial flange from said sealing element.

2. The shaft seal according to claim 1 including a plurality of circumferentially spacedapart apertures extending through said radial flange.

3. The shaft seal according to claim 2 wherein said radial portion of said sealing element has an O.D. positioned radially inwardly from said apertures.

4. The shaft seal according to claim 3 wherein said cylindrical portion extends axially inwardly from adjacent the radially outer end of said radial flange, said sealing lip extends both axially and radially inwardly, and said auxiliary lip extends axially outwardly and radially inwardly.

5. The shaft seal according to claim 4 wherein said auxiliary lip includes a radial portion extending radially outwardly beyond said plurality of apertures and including a quantity of synthetic rubber connecting said radial portion of said auxiliary lip to said filler ring through said plurality of apertures.

* * * * *

UNITED STATES PATENT AND TRADEMARK OFFICE
CERTIFICATE OF CORRECTION

PATENT NO. : 4,126,320
DATED : November 21, 1978
INVENTOR(S) : Darrell D. Pendleton It is certified that error appears in the above-identified patent and that said Letters Patent are hereby corrected as shown below:

Delete the title "SHAFT SEALS" and insert therefor
--BONDED TFE SEAL WITH DUAL LIP--.

Signed and Sealed this

Tenth Day of April 1979

[SEAL]

Attest:

RUTH C. MASON
Attesting Officer

DONALD W. BANNER
Commissioner of Patents and Trademarks